United States Patent [19]
Berkovich

[11] Patent Number: 5,099,476
[45] Date of Patent: Mar. 24, 1992

[54] COMPUTER SYSTEM WITH DISTRIBUTED CONTENT-ADDRESSABLE MEMORY

[75] Inventor: Semyon Berkovich, Rockville, Md.

[73] Assignee: Allied-Signal Inc., Morris Township, Morris County, N.J.

[21] Appl. No.: 571,173

[22] Filed: Aug. 21, 1990

Related U.S. Application Data

[63] Continuation-in-part of Ser. No. 179,464, Apr. 8, 1988, abandoned.

[51] Int. Cl.[5] ............................. H04J 3/02; H04J 3/12
[52] U.S. Cl. ................................. 370/85.1; 370/110.4
[58] Field of Search .................. 370/85.1, 109, 110.4, 370/118; 375/122, 27

[56] References Cited

U.S. PATENT DOCUMENTS

| | | | |
|---|---|---|---|
| 4,598,411 | 7/1986 | Berkovich et al. | 375/122 |
| 4,855,997 | 8/1989 | Wilson et al. | 370/85.1 |
| 4,959,843 | 9/1990 | Park | 375/122 |

*Primary Examiner*—Benedict V. Safourek
*Assistant Examiner*—Wellington Chin
*Attorney, Agent, or Firm*—Howard G. Massung; Robert A. Walsh

[57] ABSTRACT

A processing system using a number of distributed associative (content addressable) memory modules each connected through a sending device to a common serial communication bus. The memory modules are concurrently accessible by a central receiver. Data accessed from each memory module is compressed according to content induced transaction overlap (CITO) format, and the compressed data is serially communicated to the receiver according to a CITO protocol.

3 Claims, 3 Drawing Sheets

COMPUTER SYSTEM WITH DISTRIBUTED CONTENT-ADDRESSABLE MEMORY

CROSS-REFERENCE TO RELATED APPLICATIONS

This application is a continuation in part of utility patent application Ser. No. 179,464 filed Apr. 8, 1988, now abandoned.

BACKGROUND OF THE INVENTION

1. Field of the invention

The present invention relates to a system employing a number of content-addressable memories accessed by a central processor, and more particularly to a processing system using a distributed associative (content addressable) memory consisting of separate content-addressable memory modules accessible over a serial communication link through corresponding sending modules which compress and transmit data according to content induced transaction overlap (CITO) methodology.

2. Description of the Background

Serial communication channels are commonly interconnected to multiple input/output ports which transfer data in accordance with the protocol of the communication channel. The data transferred on the bus is normally determined by the input/output port given access to the bus. Normally, one word or a sequence of words or a sequence of bits of a word may be transferred serially on the bus.

In U.S. Pat. No. 4,493,074, which issued on Jan. 8, 1985 to C. J. Walter, C. R. Wilson, and S. Berkovich, a communication channel was described incorporating a content induced transaction overlap (CITO) protocol. In the '074 patent, the senders simultaneously transmit the highest order bits of their data word one bit at a time serially and monitor the state of the communication channel. Transmission of data bits is terminated by all senders which detect a difference between the state of their transmitted data bit and the state of the communication channel. Bit competition performed at the end of each transmitted data word determines which sender has lexicographically the next smallest word from among those senders still having data bits remaining to be transmitted, the sender then being activated to transmit its remaining data bits. This procedure continues until all of the senders have completed the sending of their data word. In this manner, the sender having the smallest word numerically transmits the word first on the communication channel. All senders are given an opportunity to transmit their word prior to any sender sending a second word.

The '074 Pat. No. results in significant data compression because words are simultaneously transmitted from the multiple senders to the extent that their data is redundant, the non-redundant data being transmitted sequentially. Reconstruction of a complete word is subsequently performed by the receiver which appends the higher order bits to subsequently received lower order bits.

Previously, the use of serial communication links to couple distributed memories in computer architectures was limited due to the additional time required to transmit data serially. Furthermore, the choice of memory was limited to conventional RAMs or the like which operate by conventional addressing. Certain operations such as search operations are inherently slow because each RAM must cycle through every address. The serial data transmission delay is significantly reduced by the '074 patent, which increases the rate of serial communication. If the RAM accessing delay could be eliminated, a distributed computer system which utilizes modular memories connected through a serial communication link to a central processor would be a practical system with many advantages. For example, the memory capacity could be expanded or contracted (depending upon the needs of the user) simply by connecting or disconnecting memory modules to/from the serial communications link. Furthermore, although single-processor supercomputers may be prohibitively expensive, an equivalent amount of computing power could be realized by a distributed system using numerous interconnected memory modules. The smaller memories could be manufactured at a lower cost in the aggregate.

SUMMARY OF THE INVENTION

It is, therefore, an object of the present invention to interconnect a plurality of associative memory modules through a plurality of respective senders to a single communication channel which utilizes a content induced transaction overlap (CITO) protocol.

It is another object of the invention for each sender to access data in the associative memory module connected thereto by accessing data words according to their content.

It is a further object of the invention to access data words in a plurality of distributed memory modules according to the content of the data word and without regard to the identity of the memory module holding the data word.

According to the present invention, the above-described and other objects are accomplished by providing a computer system with a distributed associative memory, the computer system comprising a serial communication bus, a receiver for receiving serial data transmitted on the serial communication bus, a number of content addressable memories for storing data and for selectively accessing the stored data based on the information content of the data, and a corresponding number of sending devices each coupled to a content addressable memory for accessing data therefrom and for compressing the data according to a content induced transaction overlap (CITO) format, each sending device also being coupled the serial communication bus for serially transmitting the CITO compressed data to the receiver pursuant to CITO protocol.

BRIEF DESCRIPTION OF THE DRAWINGS

Other objects, features and advantages of the present invention will become more apparent from the following detailed description of preferred embodiments and certain modifications thereof when taken together with the accompanying drawings, in which.

DETAILED DESCRIPTION OF THE PREFERRED EMBODIMENT

Figure 1:
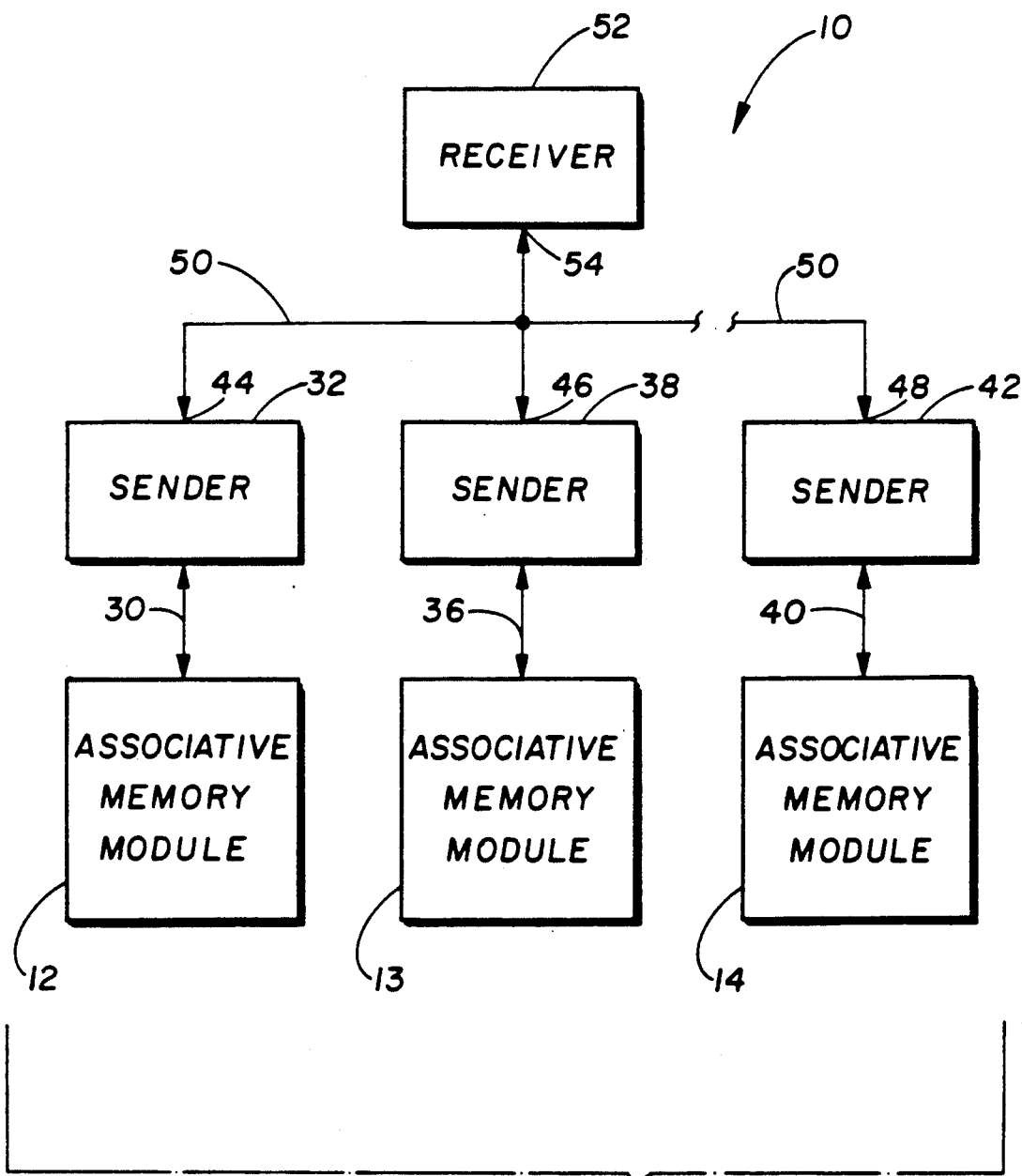
FIG. 1 is a block diagram of a computer system having a distributed content addressable memory according to one embodiment of the present invention.

FIG. 1 shows a computer system having distributed (multiple remote) associative (content addressable) memory modules 12, 13 and 14 which communicate with a central receiver 52 via a corresponding number of sending devices 32, 38 and 42 transmitting over a common serial communication bus 50.

Memory module 12 is coupled over bidirectional bus 30 to sending device 32. Memory module 13 is coupled over bi-directional bus 36 to sending device 38. Likewise, memory module 14 is coupled over bidirectional bus 40 to sending device 42. Each sending device 32, 38 and 42 has a respective bidirectional port 44, 46 and 48 which is coupled in common to communication channel 50. receiver 42 has a bidirectional port 54 which is also coupled to communication channel 50. Sending devices 32, 38 and 42 transmit binary data to one another and to receiver 52 over communication channel 50 in accordance with the content induced transaction overlap (CITO) communication protocol more fully described in U.S. Pat. No. 4,493,074 which issued Jan. 8, 1985 which is incorporated herein by reference.

Figure 2:
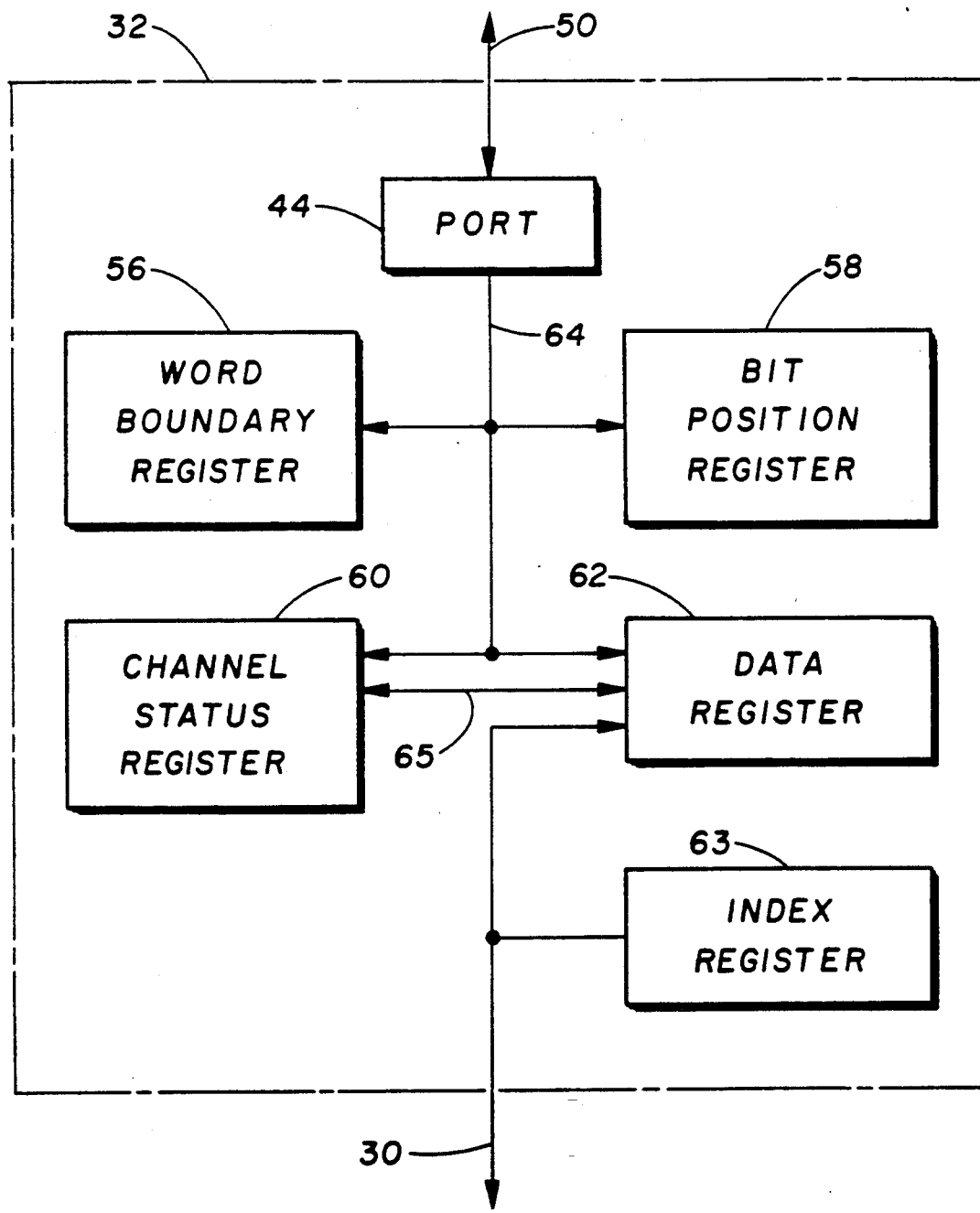
FIG. 2 is a block diagram of a sending device for use in the computer system of FIG. 1.

FIG. 2 is a schematic block diagram illustrating the primary components of sending device 32 which are identical to those of sending devices 38 and 42. Sending devices 32, 38 and 42 and receiver 52 may contain additional circuitry (not shown in FIG. 2) to enable the receiver to reconstruct and receive each data word transmitted on communication channel 50 using the CITO communication protocol. As shown, ending device 32 has a data register for storing a word of data to be transmitted over serial communication bus 50. Sending device 32 has a word boundary register 56 for storing the length (number of bits) of the data word to be transmitted. Sending device 32 also has a bit position register 58 for storing the number of bits in the data word which remain to be transmitted. Sending device 32 has a channel status register for comparing the content of the data register at a particular bit position with the binary level of the communication channel 50. In addition, sending device 32 has a port 44 for coupling communication channel 50 to word boundary register 56, bit position register 58, channel status register 60 and data register 62 over lead 64. The operation and function of sending device 32 is the same as described for sending device 10 in U.S. Pat. No. 4,493,074, which issued on Jan. 8, 1985 which is incorporated by reference to describe the operation and function of sending device 32, communication bus 50 and receiver 52. Bi-directional bus 30 is coupled to an input of data register 62 which functions to store a data word or a portion thereof which is to be transmitted on communication channel 50.

Referring back to FIG. 1, associative memory modules 12, 13 and 14 may each contain a plurality of words each having a plurality of bits to be transmitted over communication channel 50. In the present invention, the order of transmission of words over communication channel 50 is independent of their location in associative memory modules 12, 13 and 14. The order of transmission of each word is selected based on the information content of the word. Each associative memory module 12, 13 and 14 function to search through its respective memory to locate words having a predetermined information content. For example, the words having the lowest binary value may be transmitted first to the respective sending device 32, 38 or 42. The associative memory modules 12, 13 and 14 may transfer the word over its respective bidirectional bus 30, 36 and 40 either serially or in parallel. After the associative memory modules 12, 13 and 14 have sent a word to sending devices 32, 38 and 42 which in turn have transmitted the word over communication channel 50, the sending device receives an additional word from its respective associative memory module representative of the next word, for example the word having the next lowest binary value. This next word is then transmitted by the sending device over communication bus 50 using the CITO communication protocol.

Figure 3:
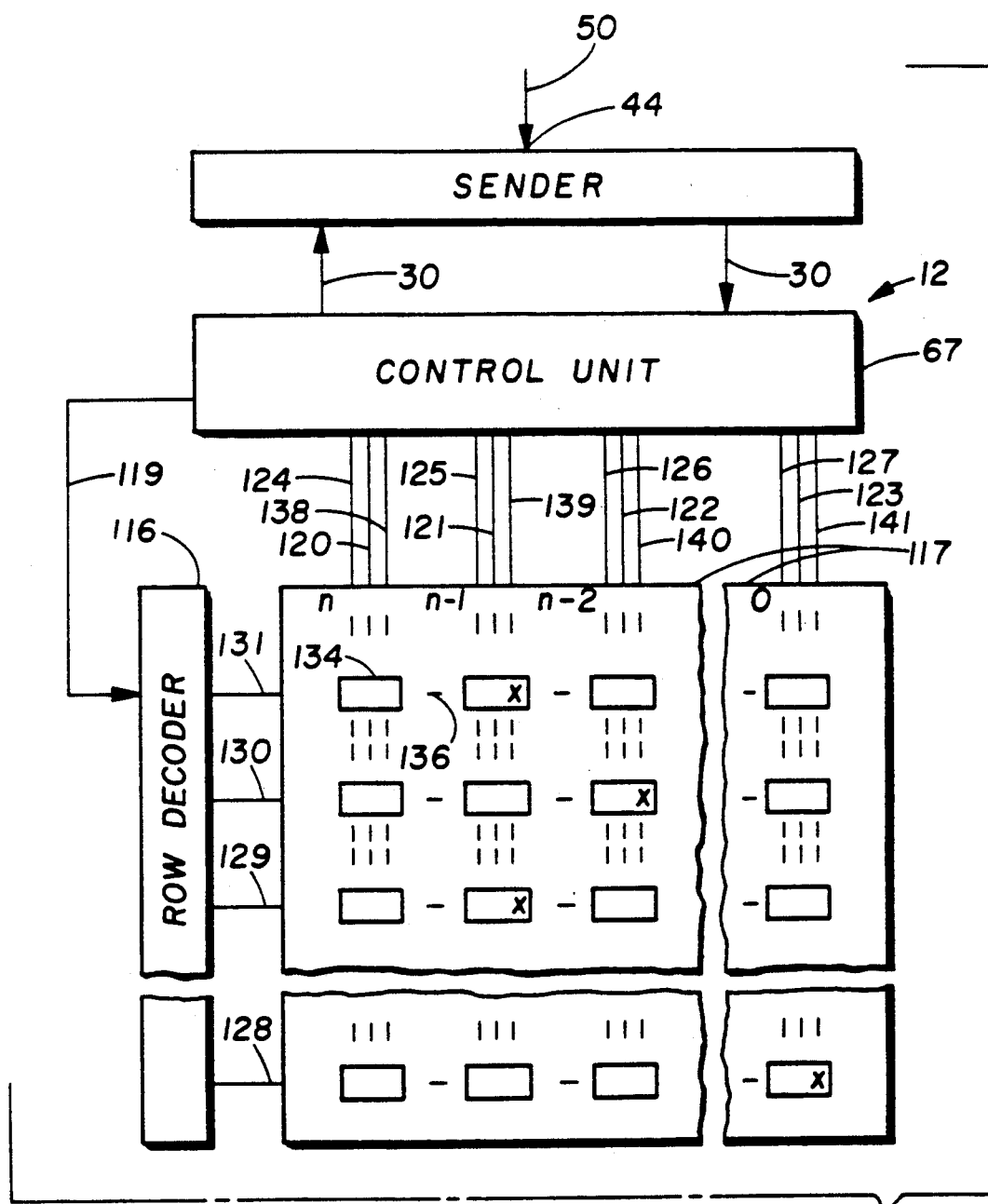
FIG. 3 is a circuit diagram of an associative memory connected within the computer system of FIG. 1.
Figure 4:
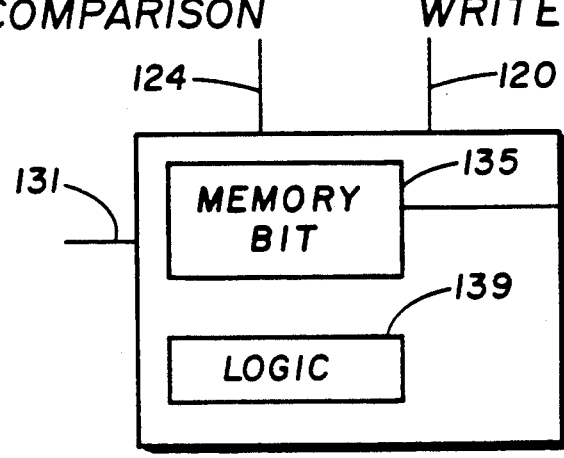
FIG. 4 is a memory cell in the associative memory of FIG. 3.

FIG. 3 is a block diagram of associative memory module 12. A conventional associative memory, such as that described in U.S Pat. No. 4,755,974 granted to Yamada et al, may be substituted for memory module 12. As illustrated in FIG. 3, memory module 12 includes a control unit 67' for converting serial data received from sender 44 into parallel data, and for converting parallel data retrieved from memory cell array 68' into serial data for transmission to sender 44. Control unit 67' also controls row addressing of memory cell array 68'.

Memory cell array 68' comprises row decoder 116, and content-addressable storage 117. Word decoder 116 receives an address from control unit 67' over bus 119. A write operation is initiated by the control unit 67' which enables control lines 120 through 123. Control unit 68' also addresses a word on lines 128–131 Which is then accessed by row decoder. Data can then be loaded into content-addressable memory 117 on lines 124, 125 and 127. A read operation is also initiated by control unit 67' which disables control lines 120 through 123. Control unit 68' then outputs a data word (or portion thereof) for which the contents of memory cell array 117 are to be searched. The data word is output to lines 124–127. Control unit 67' and row decoder 116 then cycle through all the rows of memory cell array 117. As each successive row is accessed the contents of each memory cell within that row is compared with the data word appearing on lines 124–127. A match is signalled to control unit 67' over lines 138–141.

FIG. 7 is a detail block diagram of an individual associative memory cell 134 in content-addressable memory cell array 117. In FIG. 7, memory cell 134 has a memory bit 135 which includes logic to write data into memory bit 135 on lead 124 dependent upon the data on write line 120 and word line 131. Further, memory bit 135 contains logic to perform a comparison between the data stored in memory bit 135 and the data appearing on comparison line 124. A signal indicative of a match is output on lead 138 to control unit 67'.

In operation of control unit 67' and memory 68', data to be transmitted on communication channel 50 may be loaded into content-addressable storage 117 on a word by word basis by appropriate signals to word decoder 116 and appropriate signals on comparison lines 124–127 (indicative of data to be stored) and on write lines 120–123. During a read operation the control unit 67' may transmit data indicative of the results of the comparison, or it may transmit the data contained in memory array 117 which satisfies the comparison. In either case, the data is compressed by sender 44 in CITO format, and is then transmitted serially to receiver 52 according to a CITO protocol.

Having now fully set forth the preferred embodiment and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An apparatus for distributed associative computing, comprising:

a serial communication bus;

a receiver for receiving serial data transmitted on said serial communication bus;

a plurality of content addressable memories for storing data and for selectively accessing and outputting said stored data based on an information content of said stored data; and a plurality of senders each coupled to a corresponding one of said content addressable memories for receiving said stored data output from said content addressable memory, and for encoding said stored data according to a content induced transaction overlap format, said senders each being coupled to said serial communication bus for serially transmitting said encoded data to said receiver according to a CITO protocol;

whereby each content addressable memory intercommunicates said stored data via said senders over said serial communication line to permit selective accessing of other of said content addressable memories.

2. An apparatus for distributed associative computing, comprising:

a serial communications;

a receiver connected to said serial communication bus for receiving serial data transmitted on said serial communication bus;

a plurality of content addressable memories each having data stored in a plurality of memory cells and accessing means connected to said memory cells for reading said stored data from selected ones of said memory cells whereby said memory cells are selected based on a value of said stored data; and a plurality of senders each coupled to a corresponding one of said content addressable memories for reading said stored data therefrom and for encoding said stored data in content induced transaction overlap format, each sender being coupled to said serial communication bus for serially transmitting said CITO encoded data to said receiver in synchronism with the other of said senders using CITO protocol;

whereby each content addressable memory intercommunicates said stored data via said senders over said serial communication line to permit selective accessing of other of said content addressable memories.

3. The distributed associative computing apparatus of claim 1, where each one of said senders further comprises:

a data register for storing a data word having a plurality of bits;

a serial transmitter connected between said data register and said serial communication bus for controllably communicating said stored data word to said receiver serially over said serial communication bus;

control means connecting said serial transmitter and data register for encoding said data worked according to a CITO format and for controlling said transmitter to serially transmit said compressed data word according to a CITO protocol.

* * * * *